United States Patent Office 3,238,102
Patented Mar. 1, 1966

3,238,102
SOLUBILIZATION OF HYDROCORTISONE
ACETATE
Ichiro Tanaka, Nakanoku, Tokyo, Hiroshi Yoshizawa, Musashino, Tokyo, Hiroyuki Shinkai, Urawa, Saitama, and Etsuko Hara, Kashiwa, Chiba, Japan, assignors to Taisho Pharmaceutical Co., Ltd., Tokyo, Japan, a corporation of Japan
No Drawing. Filed July 9, 1962, Ser. No. 208,639
Claims priority, application Japan, July 14, 1961, 36/24,676
10 Claims. (Cl. 167—77)

The present invention is concerned with therapeutically useful compositions containing hydrocortisone acetate in dissolved form. More particularly, the invention is concerned with the solubilization of hydrocortisone acetate whereby it may be incorporated in solubilized state into various hydrophobic and hydrophilic bases to provide therapeutically useful compositions, the therapeutic utility of which is enhanced because of the possibility of applying the hydrocortisone acetate in solubilized form.

Hydrocoritisone acetate, one of the adrenal cortical hormones, is used inter alia in the treatment of the so-called inflammatory diseases, such as rheumatoid arthritis, allergic disorders resulting in inflammation of joints and other body parts, inflammatory eye disorders, etc. One of the disadvantages of hydrocortisone acetate is its low solubility, which necessitates its use in particulate or suspended form. Enhanced therapeutic action with consequent lower effective dosages, as well as the possibility of more accurate dosing, would be realized if the hydrocortisone acetate could be applied in solubilized form, and it is to the realization of this desideratum that the present invention is addressed.

Briefly state, the indicated goal is achieved according to this invention by the solubilization of the hydrocortisone acetate by means of a fatty acid diethanolamide of the formula $$RCON\diagdown_{CH_2CH_2OH}^{CH_2CH_2OH}$$

wherein R is an alkyl group with from one to thirteen carbon atoms. Thus, suitable compounds of Formula 1, useful as solubilization agents according to the present invention, comprise N-diethanolacetamide, N-diethanolpropionamide, N-diethanolbutyramide, N-diethanolvaleramide, N-diethanolcaproamide, N-diethanolheptylamide and so on up to and including N-diethanollaurylamide and N-diethanolmyristamide.

Not only are the resultant solutions, i.e., of hydrocortisone acetate, stable per se—subject to conditions hereinafter set forth—but they can be incorporated into hydrophilic bases, e.g., oils, and especially oils which are frequently used in formulating therapeutic compositions: thus, oil of citronella, rosemary oil, oil of sassafras, oil of sweet almond, oil of thyme, castor oil, olive oil, petrolatum, etc., and they can also be incorporated into hydrophilic bases such as polyethylene glycol, or into any of the Carbowaxes (solid polyethyleneglycols of the general formula $HOCH_2(CH_2OCH_2)_xCH_2OH$) for instance Carbowax 1500W (a Carbowax with an average molecular weight of 500 to 600), or into any of the Tweens which are polyethenoxylated polyols of the type: $(OH)_nA—(OC_2H_4)_xH$, the Tween polyols being mixtures of anhydrosorbitols, for example Tween 80 which has a specific gravity of 1.05–1.10 and is essentially a polyoxyethylene derivative of sorbitan monoleate, or simply into water. In all these cases, the solubilized hydrocortisone acetate retains its dissolved state.

In the broadest aspect of the invention, the latter makes it possible to incorporate solubilized hydrocortisone acetate into almost any base or carrier material suitable for a pharmaceutical composition, provided of course that such incorporation does not result in precipitation of the hydrocortisone acetate from solution in the fatty acid diethanolamide (1). Nor does the latter have to be purified before being used for solubilization purposes, although for some therapeutic uses it may be preferable to refine the diethanolamide instead of using it as obtained by a conventional method of preparation.

In view of the fact that the solubilization according to the present invention makes possible dosing of superior accuracy and since the efficacy of the active ingredient is enhanced by its solubilization, it is found that even if the dose be decreased to about ⅙ of the quantity employed in the particulate or suspension form of application, the therapeutic effect will not be prejudiced but will remain the same. Thus, equal therapeutic action can be realized with only one-sixth of the amount of hydrocortisone acetate which has heretofore been generally employed.

An important aspect of the invention is the possibility of preparing simple aqueous solutions of hydrocortisone acetate solubilized by means of a solubilizing agent (1). In this aspect of the invention, the following data is significant:

Table 1

| 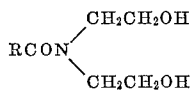 $R=$ | Water Solubility | pH of Solution (Water) |
|---|---|---|
| $CH_3$ | − | |
| $CH_3—CH_2$ | − | |
| $CH_3—(CH_2)_2$ | − | |
| $CH_3—(CH_2)_3$ | − | |
| $CH_3—(CH_2)_4$ | − | |
| $CH_3—(CH_2)_5$ | − | |
| $CH_3—(CH_2)_6$ | − | |
| $CH_3—(CH_2)_7$ | + | 9.00 |
| $CH_3—(CH_2)_8$ | + | 9.65 |
| $CH_3—(CH_2)_{10}$ | + | 9.70 |
| $CH_3—(CH_2)_{12}$ | − | |

(− designates poor water solubility; + designates good water solubility.)

A further significant aspect of the invention is shown in the following table dealing with the relationship of the ratio of quantities by weight of fatty acid diethanolamide (solubilizing agent) and hydrocortisone acetate:

Table 2

| Hydrocortisone acetate: solubilizing agent | Solubility | Water solubility | Transparency, percent (liq.) |
|---|---|---|---|
| 1:5 | + | − | 30.0 |
| 1:7 | + | − | 4.8 |
| 1:8 | + | − | 10.5 |
| 1:9 | + | + | 27.3 |
| 1:10 | + | + | 79.8 |
| 1:12 | + | + | 88.0 |
| 1:15 | + | + | 95.5 |

"Solubility" indicates solubility of the hydrocortisone acetate in the solubilizing agent (1), the symbol + showing good solubility. The symbol − shows unsatisfactory solubility. The Table 2 results were determined with a Beckmann spectrophotometer (wave length used = 630 mμ). The transparency data are specifically for a hydrocortisone acetate solution in lauryl diethanolamide; essentially the same results are obtained with other solubilizing agents (1).

Table 2 shows that satisfactory water solubility requires a smaller ratio of hydrocortisone acetate to solubilizing agent (1) than 1:9. Table 1 shows that a simple aqueous solution prepared according to this invention has a pH in the range of pH 9.0 to 9.7. However, such solution can be stabilized at other pH values as may be required, for example, in the range from 3 to 8 inclusive, by adding Tween 80 and/or polyethylene glycol to the solution, the pH change being effected by the addition of acid, such as formic acid, citric acid, benzoic acid and the like.

The transparency of the various aqueous solutions of solubilized hydrocortisone acetate thus obtainable according to the present invention is shown in the following table:

Table 3

| Adjusted pH | Composition I (percent) | Composition II (percent) | Composition III (percent) |
| --- | --- | --- | --- |
| 3.0 | 98.5 | 84.0 | 95.8 |
| 4.0 | 99.0 | 14.5 | 98.0 |
| 5.0 | 97.0 | 5.5 | 95.0 |
| 6.0 | 97.0 | 3.5 | 82.5 |
| 7.0 | 95.0 | 3.5 | 30.8 |
| 8.0 | 96.5 | 4.5 | 30.8 |
|     | 99.0 | 96.0 | 98.0 |

Note—
Composition I:

| | Parts by weight |
| --- | --- |
| Hydrocortisone acetate | 1 |
| Lauryl diethanolamide | 9 |
| Polyethylene glycol | 8 |

Composition II:

| | |
| --- | --- |
| Hydrocortisone acetate | 1 |
| Lauryldiethanolamide | 12 |

Composition III:

| | |
| --- | --- |
| Hydrocortisone acetate | 1 |
| Lauryldiethanolamide | 12 |
| Tween 80 | 6 |

The following examples set forth presently preferred illustrative embodiments of the invention:

EXAMPLE 1

An intimate admixture of one part by weight of hydrocortisone acetate and 5 parts by weight of N-diethanolacetamide is heated on the water bath for 30 to 60 minutes until complete dissolution is achieved. The resulting solution is stable against precipitation of the hydrocortisone acetate.

1 part by weight of the resultant solubilized hydrocortisone acetate (i.e., such quantity of the solution of the said acetate in the diethanolamide as corresponds to 1 part by weight by hydrocortisone acetate) is homogeneously incorporated into petrolatum (petroleum jelly) to provide a 1 to 2.5% by weight topical ointment useful for the relief of local inflammations.

EXAMPLE 2

The 5 parts by weight of N-diethanolacetamide employed in Example 1 are replaced by 7 parts by weight of N-diethanol-n-butyramide, the procedure in the first paragraph of the said example being otherwise followed without change.

1 part by weight of the resultant solution, containing solubilized hydrocortisone acetate, is homogeneously incorporated into white mineral oil (liquid petrolatum) to provide a 1 to 2.5% by weight liquid preparation useful for topical application to inflamed skin, joints, etc.

EXAMPLE 3

An intimate admixture of one part by weight of hydrocortisone acetate and 9 parts by weight of diethanolmyristamide is heated on the water bath until complete dissolution is achieved (30 to 60 minutes). One part by weight of the resultant solution is incorporated into a mixture of equal parts by weight of glycerol and petroleum jelly in such proportion that a 1 to 2.5% by weight ointment results which is effective against topical inflammation.

EXAMPLE 4

10 parts by weight of lauryldiethanolamide are homogeneously mixed with 1 part by weight of hydrocortisone acetate, the mixture heated on the water bath until dissolution has been effected. The solution is then incorporated into olive oil in such proportions that a 1 to 2.5% by weight solution results. The product is useful in treating various inflammatory processes, inter alia skin rashes.

EXAMPLE 5

One part by weight of hydrocortisone acetate is intimately admixed with 15 parts by weight of lauryldiethanolamide, and the mixture warmed on the water bath to effect dissolution. The resultant solution is incorporated into castor oil in a proportion as to yield a product containing 1 to 2.5% by weight of active ingredient (hydrocortisone acetate). The product has anti-inflammatory properties.

EXAMPLE 6

A similarly useful product is obtained if the castor oil of Example 5 is replaced by a corresponding amount of Carbowax 1500W.

EXAMPLE 7

A solution prepared according to Example 1 from 1 part by weight of hydrocortisone acetate and 10 parts by weight of lauryl diethanolamide is incorporated into an equal quantity of water to give a clear solution which has anti-inflammatory properties.

A clear solution can in fact be obtained with any desired amount of water. If such quantity of distilled water is employed as to produce a solution containing from 0.5 to 2.5% of active ingredient (hydrocortisone acetate in solubilized form), the product can be used as an ophthalmic solution.

The quantity of lauryl diethanolamide may be increased to any desired amount up to 15 parts by weight.

EXAMPLE 8

A composition (solution) containing 1 part by weight of hydrocortisone acetate and 9 parts by weight of lauryl diethanolamide, prepared according to the present invention, is admixed with 8 parts by weight of polyethylene glycol 200, and formic acid is stirred in gradually until a pH of 3.0 is achieved. The hydrocortisone acetate remains solubilized. The transparency of the so-obtained solution is 95–99%.

EXAMPLE 9

Formulation:

| | Percent by weight |
| --- | --- |
| Hydrocortisone acetate | 3.93 |
| Lauryl diethanolamide | 47.5 |
| Polyethylene glycol 200 | 23.5 |
| Tween 80 | 23.5 |
| Citric acid | 1.57 |

A hydrocortisone solution is prepared with the lauryl diethanolamide solubilizer, after the manner described in Example 1. To the resultant solution, the polyethylene glycol, Tween 80 and citric acid are added, the whole being homogeneously admixed. The resultant solution is then stirred into water in a proportion of 6.35 parts by weight of the former to 29.7 parts by weight of the latter. The so-obtained product is then poured, with stirring, into 63.95 parts by weight of a water-in-oil emulsive base (e.g., of the lanolin type). The resultant absorption composition has an adjusted pH of 7.46 and contains 0.25% hydrocortisone by weight. It is useful in treating inflammatory affections.

EXAMPLE 10

Formulation:

| | Percent by weight |
| --- | --- |
| Hydrocortisone acetate | 3.9 |
| Lauryl diethanolamide | 46.9 |
| Polyethylene glycol 200 | 23.4 |
| Tween 80 | 23.4 |
| Benzoic acid | 2.4 |

A hydrocortisone solution is prepared with the lauryl diethanolamide solubilizer, after the manner described in Example 1. To the resultant solution, the polyethylene glycol, Tween 80 and benzoic acid are added, the whole being homogeneously admixed. The resultant solution is then stirred into water in a proportion of 6.35 parts by weight of the former to 29.7 parts by weight of the latter. 6.4 parts by weight of the resultant solution are then stirred into 94.6 parts by weight of water-soluble Carbowax 1500W to yield a hydrophilic white ointment of pH 6.26 containing 0.25% by weight of hydrocortisone acetate—good for relief of inflammatory affections. The Carbowax may be replaced by white Vaseline (petroleum jelly).

Having thus disclosed the invention, what is claimed is:

1. A therapeutically useful stable solution of an anti-inflammatory effective amount of hydrocortisone acetate in a solubilizing agent of the formula

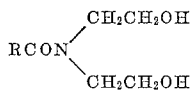

wherein R is alkyl with 1 to 13 carbon atoms inclusive.

2. A solution according to claim 1 wherein the solubilizing agent is N-diethanolacetamide.

3. A solution according to claim 1 wherein the solubilizing agent is N-diethanol-n-butyramide.

4. A therapeutically useful stable solution of an anti-inflammatory effective amount of hydrocortisone acetate in a solubilizing agent of the formula

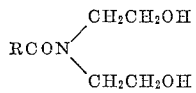

wherein R is alkyl with more than 9 and less than 13 carbon atoms.

5. A solution according to claim 4 wherein the solubilizing agent is diethanolmyristamide.

6. A therapeutically useful aqueous solution of an anti-inflammatory effective amount of hydrocortisone acetate solubilized by a solubilizing agent of the formula

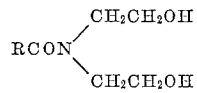

wherein R is alkyl with more than 9 and less than 13 carbon atoms, said solution having a pH of from 9.0 to 9.7.

7. A therapeutically useful aqueous solution of an anti-inflammatory effective amount of hydrocortisone acetate solubilized by a solubilizing agent of the formula

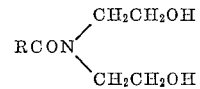

wherein R is alkyl with 1 to 13 carbon atoms inclusive, said solution containing a stabilizer and having a pH of from 3 to 8.

8. A therapeutically useful composition consisting essentially of a therapeutically useful stable solution of an anti-inflammatory effective amount of hydrocortisone acetate in a solubilizing agent of the formula

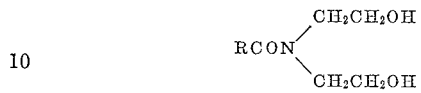

wherein R is alkyl with 1 to 13 carbon atoms inclusive, incorporated into a hydrophobic base.

9. A therapeutically useful stable solution of an anti-inflammatory effective amount of hydrocortisone acetate in a solubilizing agent of the formula

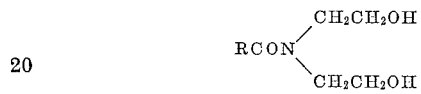

wherein R is alkyl with 1 to 13 carbon atoms inclusive, the ratio by weight of hydrocortisone acetate to solubilizing agent being less than 1:9.

10. A Therapeutically useful stable solution of an anti-inflammatory effective amount of hydrocortisone acetate in lauryl diethanolamide.

References Cited by the Examiner

UNITED STATES PATENTS

| | | | |
|---|---|---|---|
| 2,671,748 | 3/1954 | Crooks | 167—65 |
| 2,779,707 | 1/1957 | Jacobsen | 167—77 |
| 2,805,232 | 9/1957 | Baade et al. | 167—77 |
| 2,829,085 | 4/1958 | Gerber et al. | 167—77 X |
| 2,870,177 | 1/1959 | Conbere et al. | 167—77 |
| 2,970,944 | 2/1961 | Charnicki et al. | 167—77 |
| 2,980,584 | 4/1961 | Hammer | 167—65 |
| 3,008,876 | 11/1961 | Rhodes et al. | 167—65 |
| 3,019,162 | 1/1962 | Brunner et al. | 167—58 |
| 3,101,301 | 8/1963 | Siegal et al. | 167—65 |

FOREIGN PATENTS 889,329  2/1962  Great Britain.

OTHER REFERENCES

The Dispensatory of the United States of America, 25th Edition, published by J. B. Lippincott Co., Philadelphia, 1955, pages 699 and 1088.

LEWIS GOTTS, *Primary Examiner.*

JULIAN S. LEVITT, *Examiner.*

EUGENE FRANK, RICHARD HUFF,
*Assistant Examiners.*